United States Patent [19]
Williams, Jr.

[11] Patent Number: 5,882,143
[45] Date of Patent: Mar. 16, 1999

[54] LOW HEAD DAM HYDROELECTRIC SYSTEM

[76] Inventor: Fred Elmore Williams, Jr., P.O. Box 99, Dayton, Ohio 45402

[21] Appl. No.: 858,572

[22] Filed: May 19, 1997

[51] Int. Cl.$^6$ .............................. E02B 9/00; F03B 13/00
[52] U.S. Cl. ................................ 405/78; 290/53; 290/54; 405/75
[58] Field of Search .................... 405/75–78; 290/42, 290/43, 52, 53, 54

[56] References Cited

U.S. PATENT DOCUMENTS

| 439,165 | 10/1890 | Maginn . | |
|---|---|---|---|
| 1,034,603 | 8/1912 | Farley | 405/75 X |
| 1,399,558 | 12/1921 | Howe | 405/75 X |
| 1,594,578 | 8/1926 | Thurlow . | |
| 2,097,286 | 10/1937 | McGee | 290/54 |
| 2,163,102 | 6/1939 | Odill . | |
| 2,764,871 | 10/1956 | Dowling | 405/75 |
| 4,039,847 | 8/1977 | Diggs | 405/75 X |
| 4,143,990 | 3/1979 | Atencio | 405/78 |
| 4,241,283 | 12/1980 | Storer, Sr. | 290/54 |
| 4,289,971 | 9/1981 | Ueda | 290/52 |
| 4,636,141 | 1/1987 | Sedlacek | 416/86 |
| 4,717,831 | 1/1988 | Kikuchi | 290/53 |
| 5,430,332 | 7/1995 | Dunn, Jr. | 290/54 |
| 5,440,175 | 8/1995 | Mayo et al. | 290/53 X |

FOREIGN PATENT DOCUMENTS

3637564  5/1988  Germany .................................. 405/78

Primary Examiner—Dennis L. Taylor
Attorney, Agent, or Firm—Biebel & French

[57] ABSTRACT

A low head hydroelectric system for maximizing electrical power generation is disclosed. The hydroelectric system includes a support structure having a rail member adapted to be positioned above a flowing body of water adjacent a low head dam wall. An actuator is mounted to a transfer carriage which is supported for movement along the rail member. When actuated, the actuator moves an arm linearly in a vertical direction. The arm rotatably supports a water wheel including a plurality of vanes for contacting the flowing water. A generator is supported by the arm and is operably connected to the water wheel such that electricity is generated as the water wheel is caused to rotate from impact by the flowing water.

17 Claims, 7 Drawing Sheets

LOW HEAD DAM HYDROELECTRIC SYSTEM

BACKGROUND OF THE INVENTION

1. Field of the Invention

The present invention relates to a hydroelectric system and, more particularly, to an adjustable hydroelectric power generating system for facilitating maximum electricity generation in response to changing water flow conditions.

2. Description of the Prior Art

Water power has long been known as a source of tremendous potential energy for generating electricity in an efficient and clean manner. Millions of gallons of water flow through the inland waterways of the United States on a daily basis and even a small creek or stream may be used to generate a significant quantity of electricity. However, most of the water power in this country remains untapped such that this vast source of potential energy is not exploited to anywhere near its full potential.

While hydroelectric power systems are well known in the art, most of these systems are located adjacent large scale permanent dams. This type of dam dramatically increases the head of the water by increasing the level of the water on the upstream side of the dam relative to the level of water on the downstream side of the dam. As the water flows from the upstream side to the downstream side, the kinetic energy of the water increases due to an increase in velocity of the water. This kinetic energy is converted to electricity by the water passing through power generating turbines.

Unfortunately, such large scale dams typically produce adverse environmental effects on the surrounding geographical area. This type of dam reshapes the surrounding landscape by flooding large tracts of low lying land upstream therefrom. Also, large amounts of concrete, steel and other costly materials must be used in construction of the dam. Additionally, land downstream from the dam may suffer due to the regulated water supply, especially during extremely dry periods. Further, maintenance of these large structures is often very costly. Therefore, in most cases these large dams are located in remote locations where natural run off is available and where a dam can be efficiently constructed and maintained.

In contrast to the above-described large scale dams, many small streams and waterways include low dams which are characterized by dam walls having heights of 15 feet or less thereby resulting in little adverse environmental impact. Such low dams produce a much smaller head, resulting in a reduced increase in the velocity of the water, and therefore less kinetic energy available for the production of electricity. Nevertheless, considerable kinetic energy is still available for conversion to electricity by water passing over a conventional low dam.

Prior art attempts to convert the kinetic energy of water flowing over a low dam into electrical power have met with limited success. The prior art systems for generating power from a low head water supply typically comprise a water wheel mounted to the low head dam. The wheel is rotatably mounted on a axle which is attached to the dam at a location which enables flowing water to rotate the wheel and thus generate electrical power. The wheel is typically fixed in a predetermined location to optimize electricity generation during average waterflow conditions.

The rivers and streams in which low head dams and related water wheels are located often experience significant fluctuations in water level and flow rate due to various factors linked to geographical surroundings and atmospheric conditions. For example, the smaller rivers and streams possessing low heads and running over these dams typically exhibit significant increases in water levels and flow rates during periods of heavy rain such that the water of maximum velocity passes above the fixed location water wheel, resulting in decreased electricity generation. Further, during drought conditions the water levels and flow rates are often significantly diminished to the extent that the water of greatest velocity passes below the prior art water wheels such that little or no electrical power is generated.

Conventional water wheels mounted to low head dams lack the ability of being adjusted to maximize the electricity generating efficiency of the water wheel in response to changing water levels and flow rates. Electrical power is not efficiently generated by such fluctuating water supplies through the use of the prior art rigidly designed structures.

Accordingly, there is a need for a low head hydroelectric generating system providing for the efficient production of electrical power. Additionally, there is a need for a hydroelectric power generating system having a water wheel which is adjustable in response to changing water conditions. Further, there is a need for a hydroelectric power generating system having a plurality of water wheels associated with a plurality of adjustable wall panels to channel water flow to maximize the production of electrical power.

SUMMARY OF THE INVENTION

The present invention provides a low head hydroelectric power generating system including a water wheel which may be adjusted for placement in the waterflow path of greatest velocity to thereby maximize electrical output.

In accordance with the present invention, a hydroelectric system is disclosed which comprises a support structure including a rail member adapted to be positioned above a flowing waterway adjacent a low head dam wall. The rail member may have a contour substantially parallel to the downstream contour of the low head dam wall. A transfer carriage is supported for movement along the rail member. An actuator is mounted on the transfer carriage and, when actuated, moves an arm linearly in a vertical direction. A water wheel includes a shaft rotatably supported by the arm and a plurality of vanes extending outwardly from the shaft for contacting water after it flows over the dam wall thereby causing the shaft to rotate. A generator is operably connected to the shaft such that rotation of the shaft results in the generation of electricity.

An alternative embodiment the hydroelectric system of the present invention further includes a plurality of water wheels located downstream from a crest of the dam wall wherein each water wheel is independently movable relative to the crest. A plurality of diverter wall panels may be supported proximate the crest of the dam wall wherein each diverter wall panel is associated with one of the water wheels. Each diverter wall panel is independently movable relative to the crest of the dam wall whereby water may be channeled to any combination of water wheels to maximize electricity generation.

Therefore, it is an object of the present invention to provide a low head dam hydroelectric system including a water wheel which is adjustable relative to a dam wall.

It is a further object of the present invention to provide a plurality of such water wheels wherein each water wheel is independently adjustable relative to the dam wall.

It is yet another object of the present invention to provide a plurality of diverter wall panels, each diverter wall panel associated with one of the plurality of water wheels wherein water may be channeled to any combination of water wheels.

It is a further object of the present invention to provide a low head dam hydroelectric system which does not interfere with the intended function of the dam.

Other objects and advantages of the invention will be apparent from the following description, the accompanying drawings and the appended claims.

DESCRIPTION OF THE PREFERRED EMBODIMENT

Figure 1:
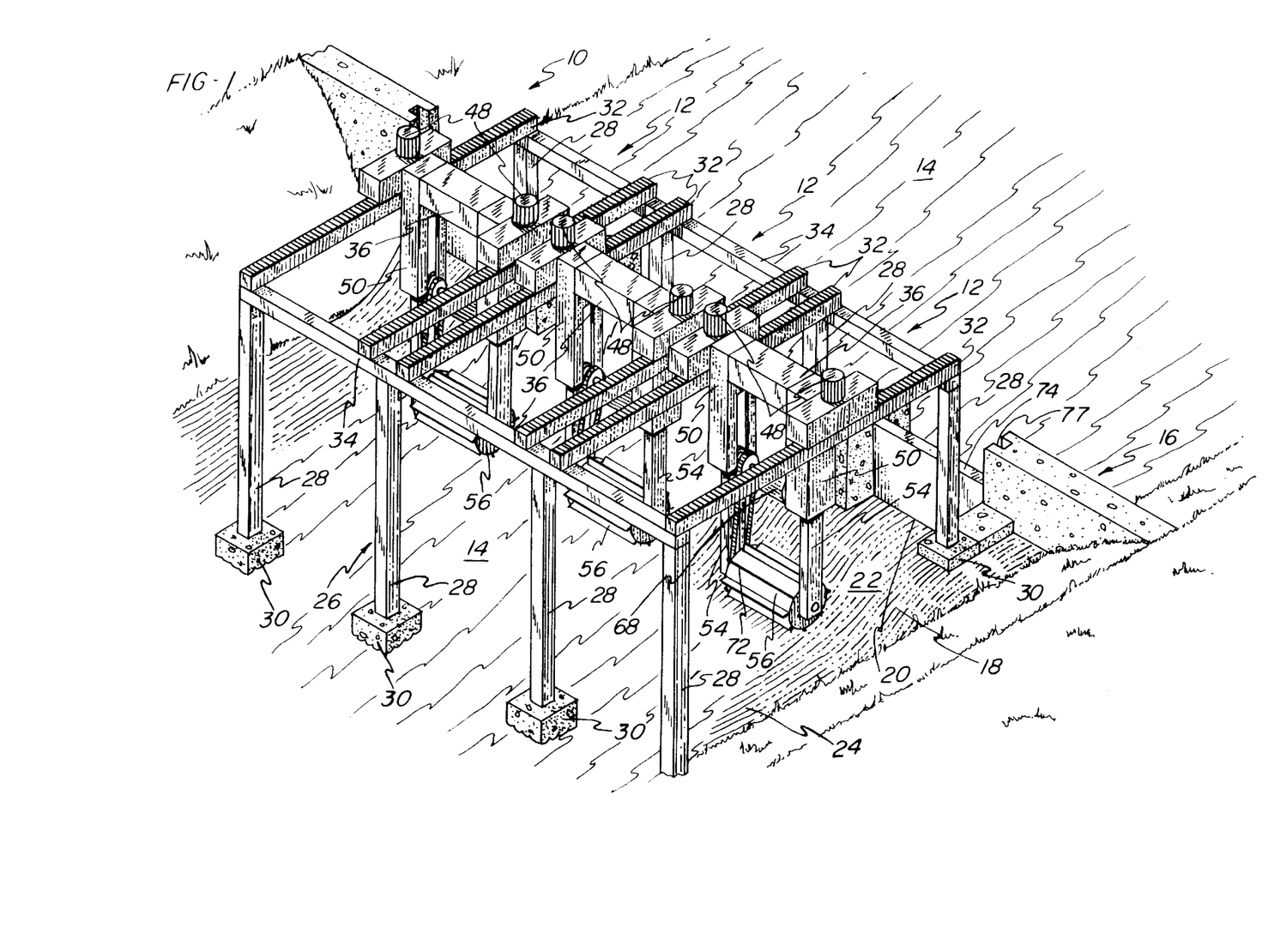
FIG. 1 is a perspective view of a hydroelectric system of the present invention located adjacent a low dam.
Figure 2:
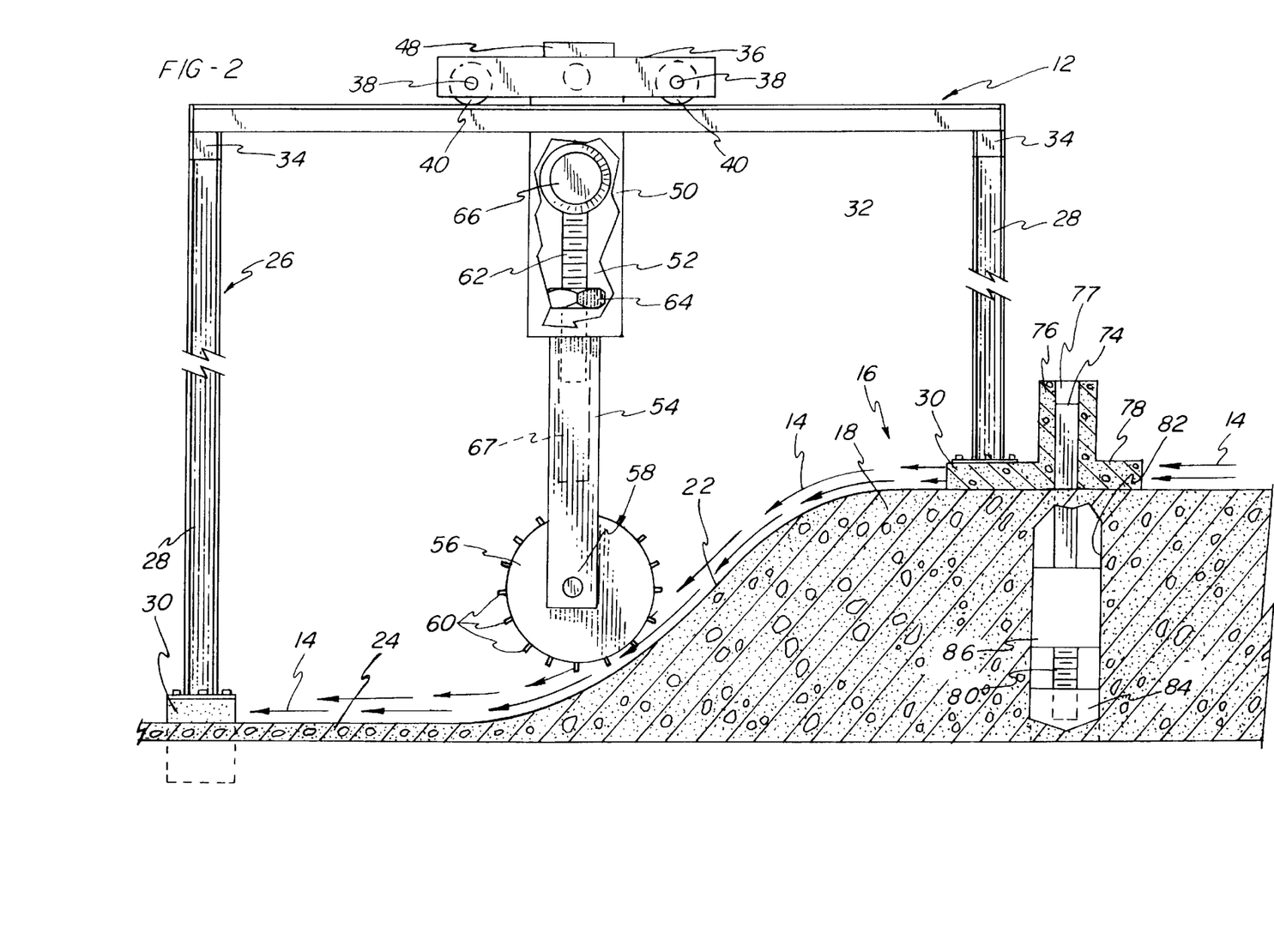
FIG. 2 is a side elevational view with a partial cutaway of a hydroelectric power generating unit of the present invention.

Referring initially to FIGS. 1 and 2, a hydroelectric system 10 of the present invention is illustrated as including a plurality of hydroelectric generating units 12. The generating units 12 are disposed in a side-by-side relationship in the widthwise direction of a flowing body of water 14. The water 14 flows from the upstream or right-hand side to the downstream or left-hand side of FIGS. 1 and 2.

The hydroelectric system 10 of the present invention is adapted to be located adjacent a low dam 16 in a manner not interfering with the intended operation of the dam 16. The low dam 16 includes a dam wall 18 defining a crest 20 which is the highest elevation of the dam wall 18 and over which the water 14 passes. As the water 14 passes over the crest 20, it follows a downstream contour 22 of the dam wall 18 to a lower elevation defined by a base 24. As the water 14 flows from the crest 20 to the base 24 over the contour 22, it accelerates due to gravitational force, thereby increasing its velocity or flow rate.

The hydroelectric system 10 of the present invention facilitates the adjustment and optimum placement of various components of the generating units 12 for maximum electrical power production in response to the available quantity and flow of water 14 passing over the dam wall 18. However, from the following description it will be appreciated that the hydroelectric system 10 of the present invention may find equal applicability above a flowing body of water 14 absent the low dam 16.

A support structure 26 supports the generating units 12 and includes uprights 28 supported upon the low dam 16. It should be noted that no substantial modification of the low dam 16 is required for the installation of the hydroelectric system 10 of the present invention. The uprights 28 may be simply supported by being bolted to concrete mounting blocks 30 added to the existing low dam 16 at the dam wall 18 and base 24 (FIG. 2). Rail members 32 are supported by the uprights 28 and are disposed in a substantially horizontal plane. The rail members 32 extend from proximate the crest 20 in a downstream direction substantially parallel to the flow of water 14. Cross members 34 are perpendicularly disposed to the rail members 32 and fixed to the uprights 28 to stabilize and rigidify the entire support structure 26.

Figure 3:
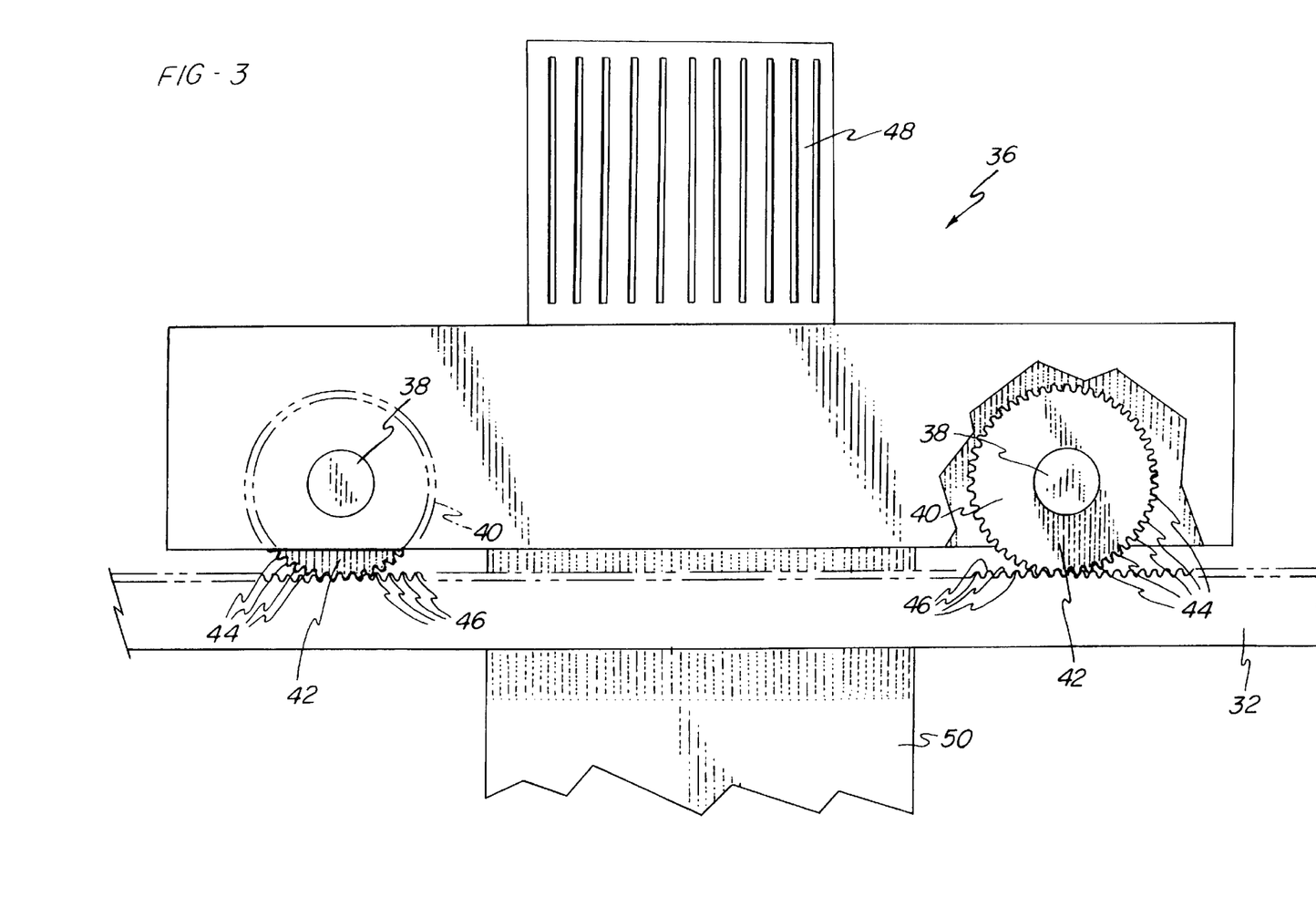
FIG. 3 is a detail side elevational view with a partial cutaway of a transfer carriage of the present invention.
Figure 4:
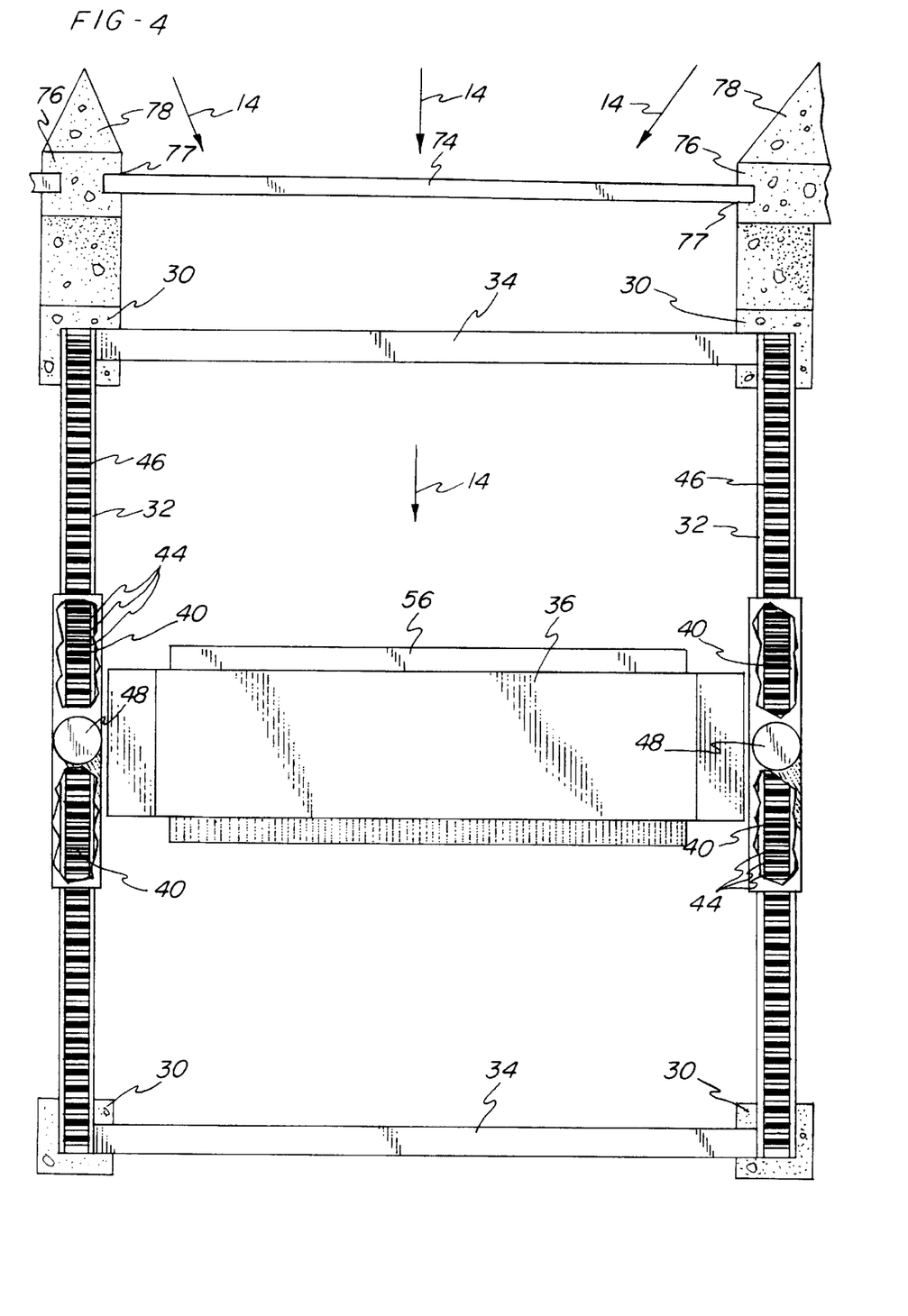
FIG. 4 is a top view with a partial cutaway of the hydroelectric power generating unit of FIG. 2.

A transfer carriage 36 is movable along a pair of the rail members 32. Referring to FIGS. 3 and 4, shafts 38 are rotatably mounted to the transfer carriage 36. Each shaft 38 supports a wheel 40 including a body portion 42 having a plurality of teeth 44 extending about its periphery. The teeth 44 are adapted to engage recessed portions 46 within the rail members 32 for facilitating accurate positioning and positive traction of the transfer carriage 36 along the rail members 32. Motors 48 are operably connected to the shafts 38 in a manner as is well known in the art, such that when the motors 48 are activated the wheels 40 rotate and propel the transfer carriage 36 along the rail members 32.

Figure 5:
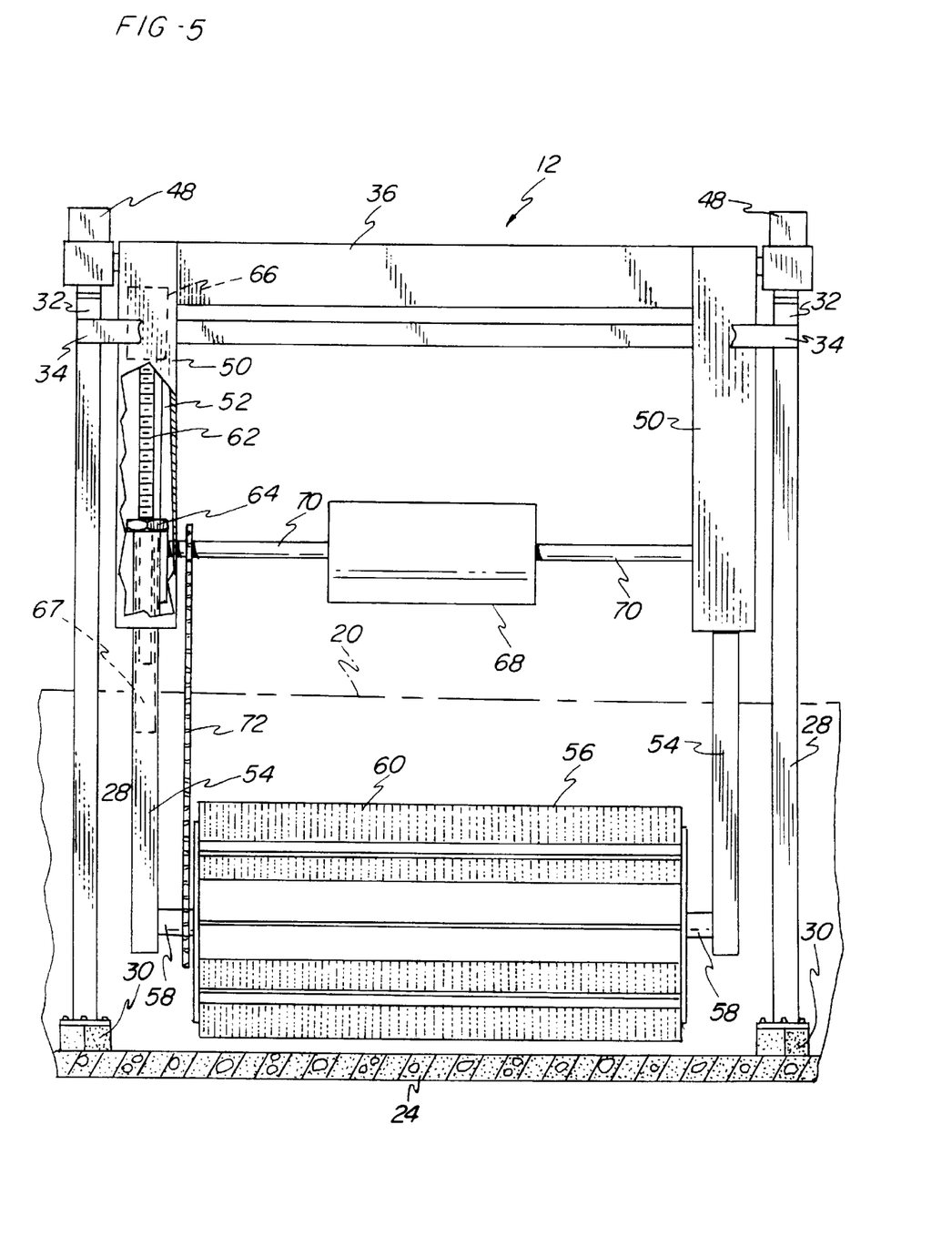
FIG. 5 is a front view with a partial cutaway of the hydroelectric power generating unit of FIG. 2.

Turning now to FIGS. 1, 2 and 5, each transfer carriage 36 further includes a pair of support arms 50 extending downwardly from the transfer carriage 36 to a position below the rail members 32. Each support arm 50 includes an internal channel 52 for receiving a movable arm 54 which supports a water wheel 56. More particularly, the water wheel 56 includes a shaft 58 rotatably supported between a pair of the movable arms 54. Each water wheel 56 further includes a plurality of vanes 60 extending outwardly from the shaft 58 for contacting the flowing water 14, thereby causing the shaft 58 to rotate.

An actuator, preferably a screw jack 62, is rotatably supported by the transfer carriage 36 and is received within the internal channel 52 of the support arm 50. A lifting nut 64 is mounted to the movable arm 54 for threadably engaging the screw jack 62. A motor 66 is mounted to the transfer carriage 36 and rotates the screw jack 62 thereby raising or lowering the lifting nut 64, movable arm 54 and water wheel 56. A cylindrical bore 67 is formed within the movable arm 54 for receiving the screw jack 62 when the movable arm 54 rises relative to the screw jack 62.

An electrical generator 68 is supported by the movable arm 54 and moves therewith. More particularly, the generator 68 is of the type well known in the art and includes a shaft 70 which is rotatably mounted to the movable arm 54. The shaft 70 is operably coupled to the water wheel 56 by a chain 72, although any suitable coupling member may be substituted therefor. As the shaft 58 of the water wheel 56 rotates, the chain 72 transfers such rotational movement to the shaft 70 wherein the generator 68 will generate electricity. Since both the generator 68 and the water wheel 56 are mounted to the movable arms 54, a constant spacing is provided between the generator 68 and the water wheel 56.

With further reference to FIGS. 1, 2 and 4, a further embodiment of the hydroelectric system 10 of the present invention includes a plurality of diverter wall panels 74 provided adjacent the crest 20 of the dam wall 18. Each diverter wall panel 74 is separated by a fixed wall panel 76 fixed on the crest of the dam wall 18. The diverter wall panels 74 are slidably received within grooves 77 formed within the fixed wall panels 76 thereby providing for sealing engagement and preventing the flow of water 14 therebetween. As illustrated by FIG. 4, each fixed wall panel 76 includes a channeling member 78 to channel the water 14 to at least one of the diverter wall panels 74 wherein each diverter wall panel 74 is aligned with one of the water wheels 56.

Each diverter wall panel 74 is independently movable in a vertical direction to thereby channel the flowing water 14 to a particular water wheel 56 or combination of water wheels 56. Turning again to FIG. 2, a linear actuator, preferably a screw jack 80, is supported within a chamber 82 formed within the dam wall 18 and is driven in rotation by a motor 84. A lifting sleeve 86 is fixed to the bottom of each diverter wall panel 74 and threadably engages the screw jack 80 such that rotation of the screw jack 80 causes vertical movement of the diverter wall panel 74. The sleeve 86 slidably engages the inside surface of the chamber 82 for providing additional support to the wall panel 74. As the diverter wall panel 74 lowers, it is received within the chamber 82 which is sealed from water 14 in a manner as is well known in the art.

Figure 6:
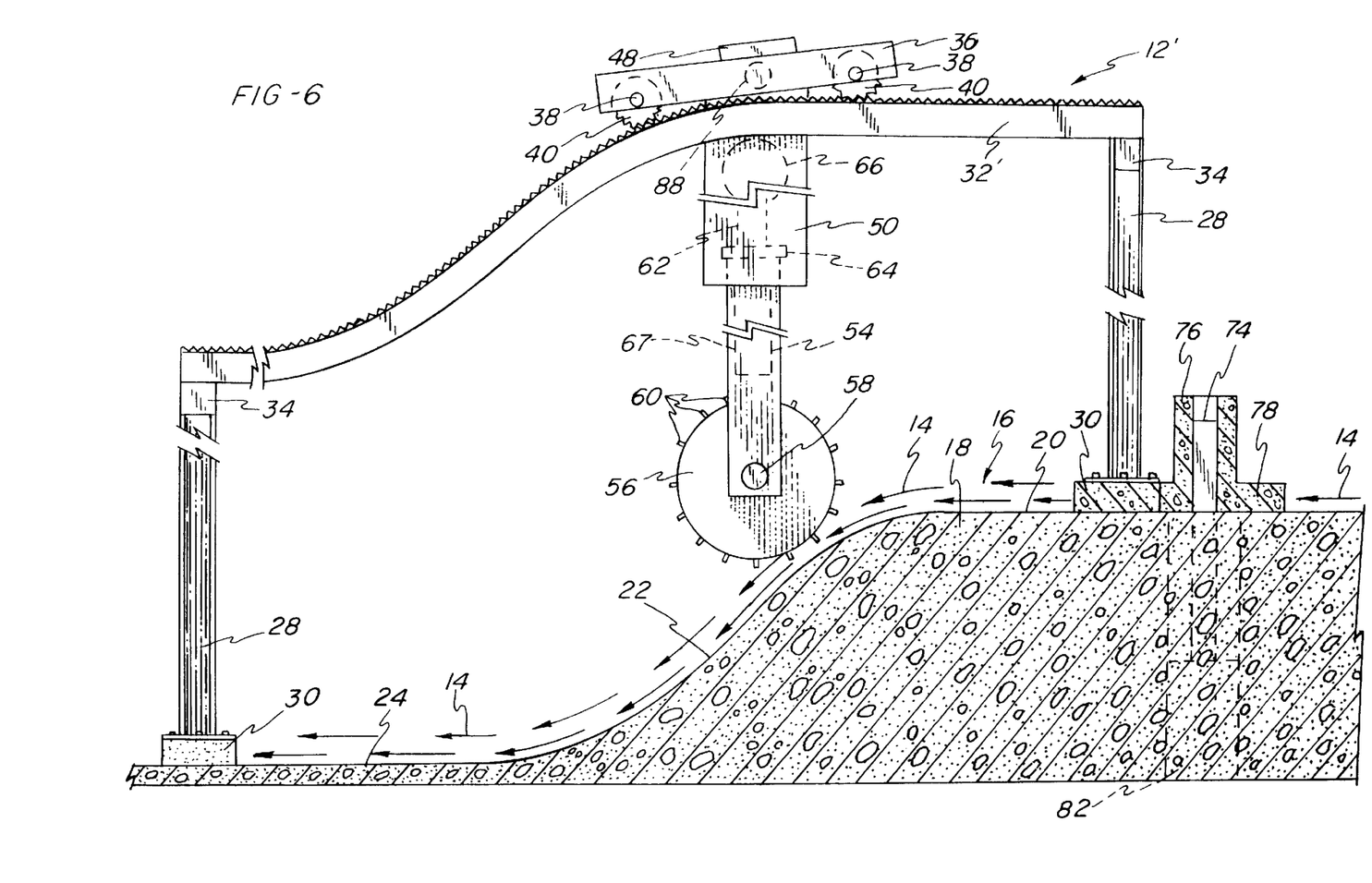
FIG. 6 is a side elevational view of an alternative embodiment of a hydroelectric power generating unit of the present invention.

Turning now to FIG. 6, an alternative embodiment of the hydroelectric generating unit 12' of the present invention is illustrated as including contoured rail members 30'. In this embodiment, like reference numerals refer to like components as described above with respect to the embodiment of FIGS. 1–5. The contour of each rail member 32' substantially parallels the contour 22 defined by the wall 18 of the low dam 16. Since the waterflow 14 will tend to follow the contour 22 of the dam 16, movement of the transfer carriage 36 and water wheel 56 along a substantially parallel path as defined by rail member 32' reduces the necessary vertical adjustments to the water wheel 56 by actuation of the screw jack 62.

The support arm 50 is preferably pivotally mounted to the transfer carriage 36 by a pivot pin 88 such that the support arm 50 and movable arm 54 are always maintained in a substantially vertical position. A locking means (not shown) is provided to fix the support arm 50 in a desired position on the pivot pin 88.

The water wheel 56 of the present invention is readily movable in response to changing waterflow conditions, including both the velocity and volume of water 14 passing over the low dam wall 18. More particularly, during high water or flood conditions, the water wheel 56 may be moved horizontally along the rail members 32 or 32' toward the dam wall 18 and vertically to an elevated position wherein the vanes 60 of the water wheel 56 are impacted by the water 14 having the greatest velocity. Similarly, during low water or drought conditions, the water wheels 56 may be moved horizontally away from the dam wall 18 and to a lowered position such that the vanes 60 are once again impacted by the water 14 of greatest velocity.

In combination with the movement of the water wheels 56, the diverter wall panels 74 may be adjusted for varying waterflow conditions such that during flood conditions, a majority or all of the diverter wall panels 74 are lowered such that most or all of the water wheels 56 are rotated by the force of the water 14 and thereby maximizing electricity generation. However, during drought conditions only a limited number of diverter wall panels 74 are in the lowered position such that the water 14 is channeled to only a few water wheels 56 wherein the limited flow of water 14 is most efficiently utilized.

Figure 7:
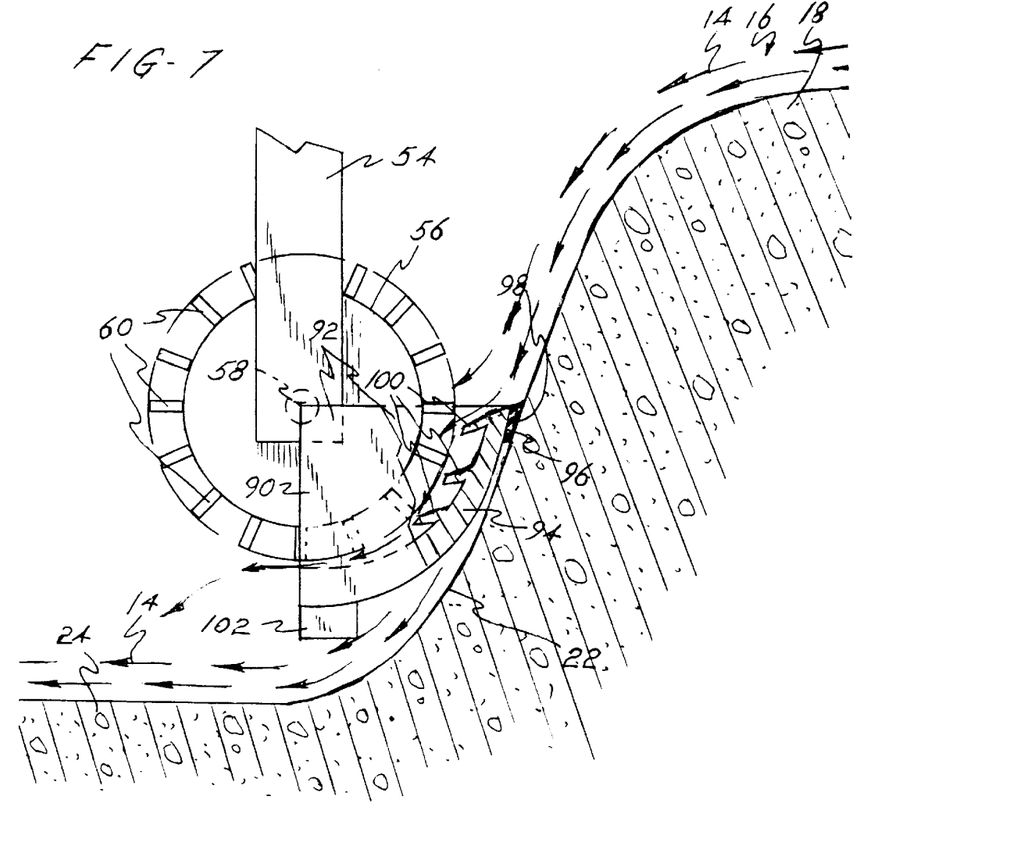
FIG. 7 is a side elevational view with a partial cutaway of a water shield for use with the present invention.
Figure 8:
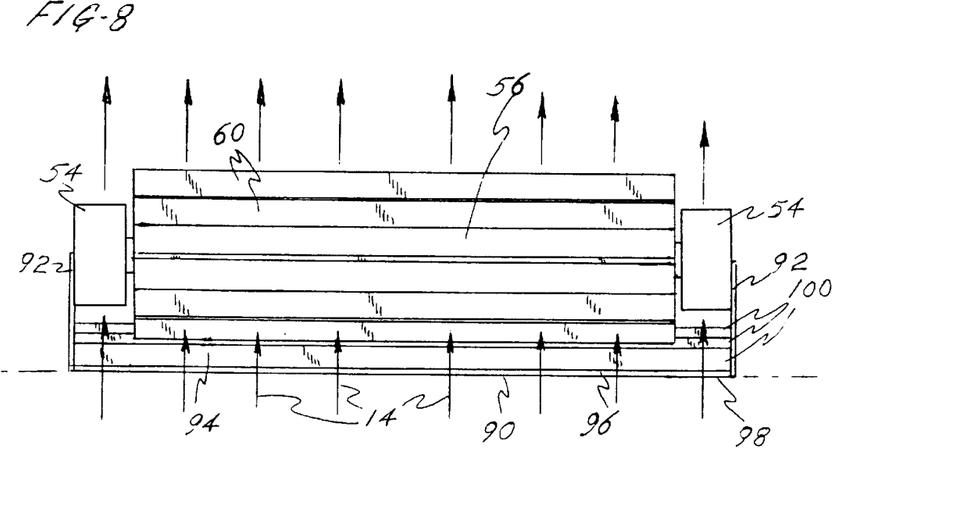
FIG. 8 is a top view thereof.

Referring now to FIGS. 7 and 8, a water shield 90 may be located adjacent each water wheel 56. Each shield 90 includes a pair of side walls 92 in spaced relation to each other, wherein each side wall 92 is fixed to one of the movable arms 54. An arcuate plate 94 is connected to the side walls 92 to substantially define a partial cylinder. A resilient member 96 is fixed to the arcuate plate 94 between the side walls 92 and is adapted to be located in a sealing relationship with the dam wall 18 along a line of contact 98. It may be appreciated that the water shield 90, and therefore resilient member 96 and line of contact 98 move relative to the dam wall 18 upon movement of arm 54. The line of contact 98 and arcuate plate 94 assist in further directing the flow of water 14 to the vanes 60 of the water wheel 56. Power generating efficiency is thereby enhanced since substantially all of the water 14 passing over the dam wall 18 is directed into contact with the vanes 60 of at least one of the water wheels 56.

A plurality of diverter strips 100 may be fixed to the inner surface of the arcuate plate 94 between the side walls 92 to assist in directing the water 14 to the vanes 60 of the water wheel 56. Each diverter strip 100 is angled relative to the arcuate plate 94 in a manner for directing the maximum amount of water 14 to the vanes 60. A buoyant member 102 may be fixed to the outer surface of the arcuate plate 94 below the water wheel 56 to float and thereby support a majority of the weight of the shield 90, water wheel 56, and generator 68. The overall size of the support structure 26 and the arms 50 and 54 may therefore be significantly reduced. The buoyant member 102 may comprise any sufficiently buoyant material for floating upon the water 14 pooling above the base 24 of the dam 16.

From the above description, it should be apparent that the present invention provides for an economical and efficient way of generating electricity from water flowing over low dams. Further, the present invention provides for a hydroelectric system which is readily adaptable to varying waterflow conditions through the use of water wheels movable relative to the wall of a low dam. Additionally, the present invention provides for diverter wall panels in combination with such movable water wheels to channel the water to particular water wheels and thereby provide for the maximum production of electricity given any waterflow condition.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A hydroelectric system comprising:
   a support structure including a rail member adapted to be located above a flowing waterway;
   a transfer carriage supported for movement along said rail member;
   an actuator mounted on said transfer carriage;
   an arm actuated by said actuator to move in a vertical direction; and
   a water wheel including a shaft rotatably supported by said arm and a plurality of vanes extending outwardly from said shaft.

2. The hydroelectric system of claim 1 wherein said transfer carriage further comprises at least one wheel driven in rotation for moving said transfer carriage along said rail member.

3. The hydroelectric system of claim 1 wherein said actuator comprises a screw jack rotatably mounted to said transfer carriage, whereby said arm moves linearly in a vertical direction as said screw jack rotates.

4. The hydroelectric system of claim 1 further comprising a generator supported by said arm and coupled to said water wheel for generating electricity as said water wheel rotates.

5. A hydroelectric system adapted to be supported adjacent a low head dam producing an accelerated waterflow, the low head dam including a dam wall having a downstream contour, said hydroelectric system comprising:

a support structure including a rail member having a contour substantially parallel to the downstream contour of the dam wall;

a transfer carriage supported for movement along said rail member;

an arm supported by said transfer carriage;

a water wheel including a shaft rotatably supported by said arm and a plurality of vanes extending outwardly from said shaft.

6. The hydroelectric system of claim 5 further comprising an actuator mounted on said transfer carriage for moving said arm in a vertical direction.

7. The hydroelectric system of claim 6 wherein said actuator comprises a screw jack rotatably mounted to said transfer carriage, whereby said arm moves linearly in a vertical direction as said screw jack rotates.

8. The hydroelectric system of claim 5 wherein said transfer carriage further comprises at least one wheel driven in rotation for moving said carriage along said rail member.

9. The hydroelectric system of claim 8 wherein said at least one wheel includes a body and a plurality of teeth extending radially outwardly from said body, and said rail member includes a plurality of recessed portions adapted for engaging said teeth thereby facilitating movement of said transfer carriage along said rail member.

10. The hydroelectric system of claim 5 further comprising a generator supported by said arm and coupled to said water wheel for generating electricity as said water wheel rotates.

11. A hydroelectric system for use in combination with a low head dam producing an accelerated waterflow, said low head dam including a dam wall having a downstream contour, said hydroelectric system comprising:

a support structure positioned above said dam wall;

a plurality of arms, each of said arms connected to and extending downwardly from said support structure in spaced relation to said dam wall;

plurality of actuators, each of said actuators supported by said support structure and operably connected to at least one of said arms for driving said at least one of said arms in vertical movement;

plurality of water wheels, each of said water wheels including a shaft rotatably supported by at least one of said arms and a plurality of vanes extending outwardly from said shaft; and     wherein each of said water wheels is independently movable relative to said dam wall.

12. The hydroelectric system of claim 11 wherein said support structure includes a plurality of uprights supported on said dam, and a plurality of rail members fixed to said uprights and located above the accelerated waterflow.

13. The hydroelectric system of claim 12 further comprising a plurality of transfer carriages, each said transfer carriage supported on at least one of said plurality of rail members for horizontal movement therealong.

14. A hydroelectric system for use in combination with a low head dam producing an accelerated waterflow, said low head dam including a dam wall having a crest and a downstream contour downstream from said crest, said hydroelectric system comprising:

a plurality of water wheels, each of said water wheels independently movable relative to said crest;

a plurality of first actuators operably connected to said plurality of water wheels for driving said water wheels in movement;

a plurality of diverter wall panels supported on dam wall upstream in spaced relation to said plurality of water wheels;

a plurality of second actuators connected to said plurality of diverter wall panels for driving said diverter wall panels in movement, said plurality of second actuators positioned in spaced relation to said plurality of first actuators; and     wherein each one of said diverter wall panels is associated with one of said water wheels and independently movable relative to said crest of said dam wall and to said plurality of water wheels.

15. The hydroelectric system of claim 14 wherein each of said second actuators comprises a rotatably mounted screw jack, whereby each of said diverter wall panels moves linearly in a vertical direction as said screw jack rotates.

16. The hydroelectric system of claim 14 further comprising at least one fixed wall member interspaced between said plurality of diverter wall panels wherein each of said diverter wall panels is aligned with one of said water wheels.

17. The hydroelectric system of claim 16 wherein said at least one fixed wall member sealingly engages said diverter wall panels for preventing waterflow therebetween.

* * * * *